US012761168B2

(12) United States Patent
Huber

(10) Patent No.: US 12,761,168 B2

(45) Date of Patent: Oct. 13, 2026

(54) SENSOR ELEMENT, TEST DEVICE, AND METHOD FOR TESTING A DATA CARRIER HAVING A SPIN RESONANCE FEATURE

(71) Applicant: GIESECKE+DEVRIENT CURRENCY TECHNOLOGY GMBH, Munich (DE)

(72) Inventor: Stephan Huber, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 143 days.

(21) Appl. No.: 18/863,031

(22) PCT Filed: May 5, 2023

(86) PCT No.: PCT/EP2023/025208

§ 371 (c)(1),
(2) Date: Nov. 5, 2024

(87) PCT Pub. No.: WO2023/213437

PCT Pub. Date: Nov. 9, 2023

(65) Prior Publication Data

US 2025/0290879 A1 Sep. 18, 2025

(30) Foreign Application Priority Data

May 6, 2022 (DE) ..................... 10 2022 001 599.4

(51) Int. Cl.
*G01N 24/08* (2006.01)

(52) U.S. Cl.
CPC .................................... *G01N 24/08* (2013.01)

(58) Field of Classification Search
None
See application file for complete search history.

(56) References Cited

U.S. PATENT DOCUMENTS 4,943,809 A * 7/1990 Zaghloul .............. H01Q 9/0457 343/700 MS
5,149,946 A 9/1992 Jerome et al.
(Continued)

FOREIGN PATENT DOCUMENTS

DE 102005010894 A1 * 9/2006 ........... H01Q 9/0414
JP 2020043422 A * 3/2020

OTHER PUBLICATIONS

Jones et al., "Quadrature Strip-Line Surface Coil for Ultra-High Field Imaging (7T)", Proceedings of the International Society for Magnetic Resonance in Medicine, vol. 15, May 5, 2007, p. 1065.
(Continued)

*Primary Examiner* — Rodney E Fuller
(74) *Attorney, Agent, or Firm* — Workman Nydegger

(57) ABSTRACT

A sensor element is for testing a planar data carrier that has a spin resonance feature. The sensor element includes: a magnetic core having an air gap into which the planar data carrier can be inserted for testing purposes; a polarization device for generating a static magnetic flux in the air gap; and a resonator device for exciting the spin resonance feature of the data carrier to be tested in the air gap. The resonator device has a stripline resonator and a supply structure for the stripline resonator and is designed to generate a high-frequency field with circular polarization owing to the geometry of the stripline resonator and/or the geometry of the supply structure.

14 Claims, 2 Drawing Sheets

(56) References Cited

U.S. PATENT DOCUMENTS

| | | | |
|---|---|---|---|
| 2002/0171589 A1 | 11/2002 | Nistler et al. | |
| 2014/0117988 A1 | 5/2014 | Annino et al. | |
| 2015/0253398 A1 | 9/2015 | Ferrand et al. | |

OTHER PUBLICATIONS

Pang, Yong et al., "Quadrature transmit array design using single-feed circularly polarized patch antenna for parallel transmission in MR imaging", Quantitative Imaging in Medicine and Surgery, vol. 4, No. 1, Feb. 25, 2014, pp. 11-18.

Punetha, Deepak et al., "An Efficient Progressive Analysis on Different Dielectric Substrates to Design a Circular Polarized Equilateral Triangular Shape Microstrip Patch Antenna for L-band", 2015 Second IEEE International Conference on Advances in Computing & Communication Engineering, as early as May 1, 2015, pp. 139-143.

German Search Report from corresponding German Patent Application No. DE102022001599.4, Oct. 17, 2022.

International Search Report from corresponding PCT Application No. PCT/EP2023/025208, Aug. 10, 2023.

* cited by examiner

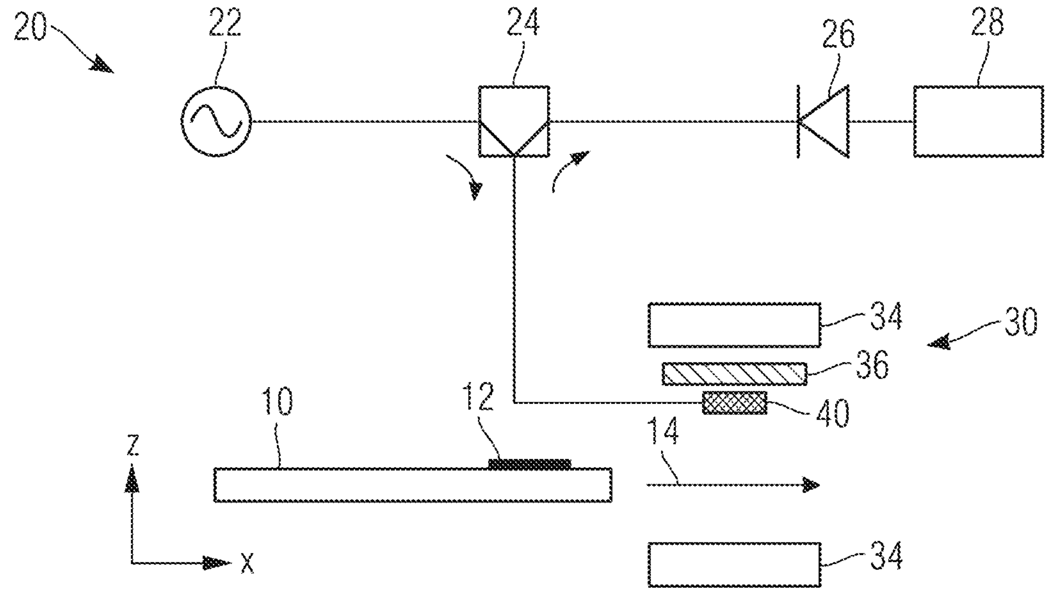
Fig. 1
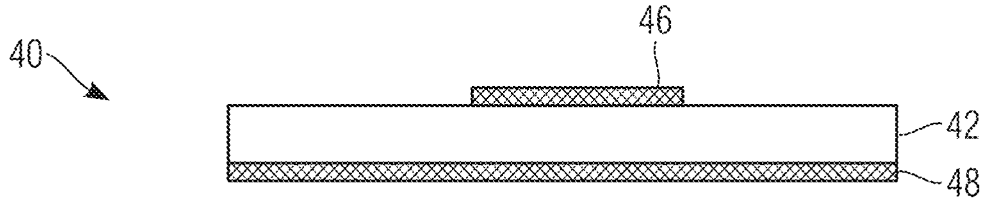
Fig. 2(a)
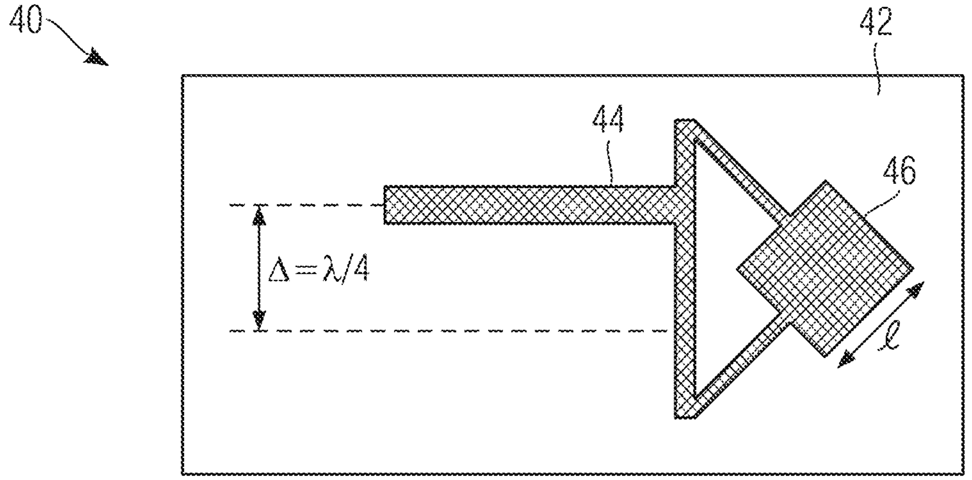
Fig. 2(b)
Fig. 2

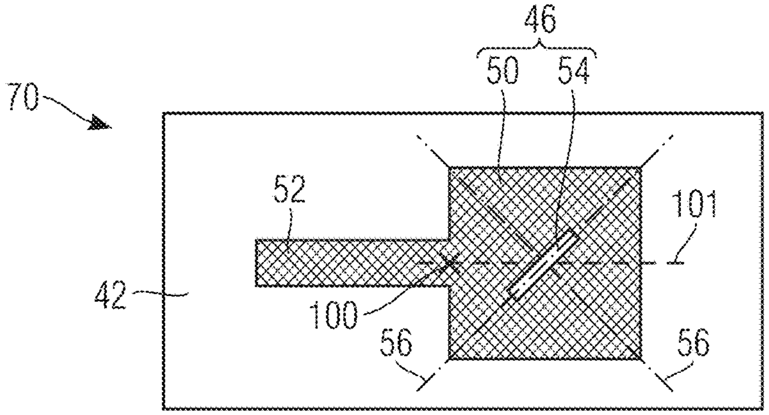
Fig. 3(a)
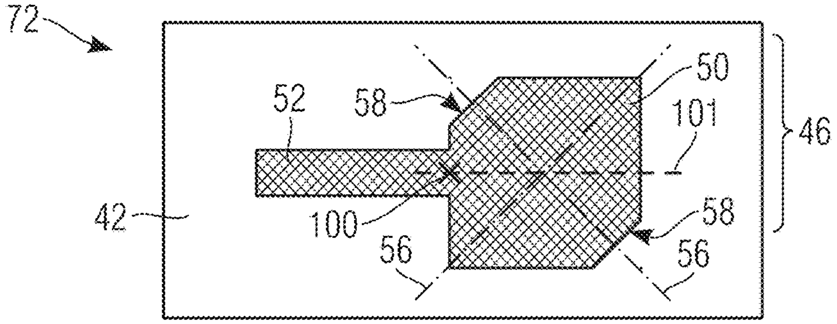
Fig. 3(b)
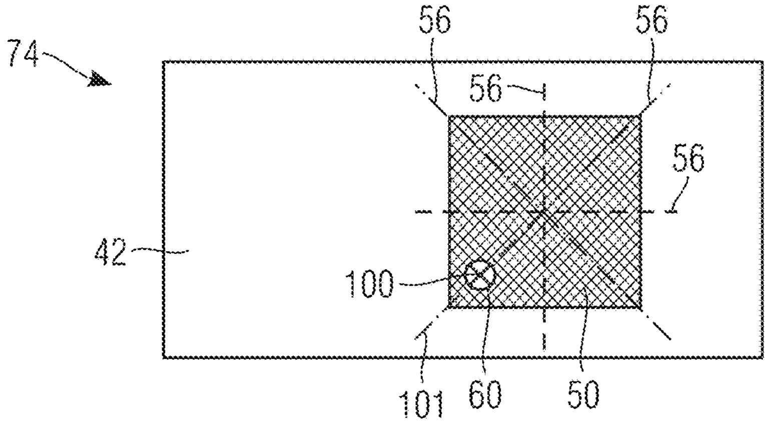
Fig. 3(c)
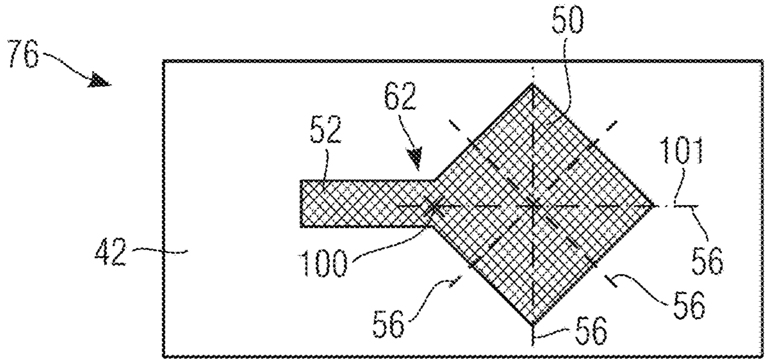
Fig. 3(d)
Fig. 3

SENSOR ELEMENT, TEST DEVICE, AND METHOD FOR TESTING A DATA CARRIER HAVING A SPIN RESONANCE FEATURE

BACKGROUND

The invention relates to a sensor element for testing the authenticity of a planar data carrier, in particular a banknote, having a spin resonance feature. The invention also relates to a test apparatus having such a sensor element and to a method for testing authenticity by way of such a sensor element or such a test apparatus.

Data carriers, such as value or identification documents, but also other valuable objects, such as brand-name articles, are often provided with security elements that allow the data carriers to be authenticated and that also serve as protection against unauthorized reproduction. It is well known in the field of machine authentication to use security elements with spin resonance features to secure documents and other data carriers. To this end, the security elements are provided with substances that have a spin resonance signature. The spin resonance signatures that can be used for authenticity testing include, in particular, nuclear magnetic resonance (NMR) effects, electron spin resonance (ESR) effects, and ferromagnetic resonance (FMR) effects.

To detect the spin resonance signatures when testing banknotes, it is usual for three different magnetic fields to be created in the measurement region of a banknote processing machine, for example. This is specifically a quasi-static polarization field $B_0$, which runs parallel to the axial direction (z direction) of the air gap of a magnetic circuit. A second magnetic field is formed by a modulation field $B_{mod}$, which also runs parallel to the z-axis and typically has a frequency $f_{mod}$ in the kHz range. For the excitation of transitions between the split spin energy levels of the spin resonance signature substances, an excitation field $B_1$ is provided, which is polarized perpendicular to the $B_0$ direction. In this context, the excitation field oscillates at the resonant frequency of the material, which is also referred to as Larmor frequency and which is proportional to the polarization field $B_0$.

To create the polarization field $B_0$, a magnetic circuit is often used that directs the magnetic flux of permanent magnets and/or coils to an air gap in which the testing of the planar data carriers takes place.

A radiofrequency resonator, for example a stripline resonator, is used to create the excitation field $B_1$. This is a conductive structure of characteristic length l, which is arranged on a carrier. If the wavelength λ of the incoupled radiofrequency signal matches the dimension l of the conductive structure during the authenticity test, then a standing wave can form in the resonator, and the stripline resonator is in resonance with the excitation frequency belonging to the wavelength λ. Since the extent of a stripline resonator is significantly greater in the plane of the carrier than perpendicular thereto, this is also referred to as the plane of the stripline resonator, which corresponds to the plane of the carrier. Conventional stripline resonators create a linearly polarized radiofrequency field, but only a fraction of its energy can be used to excite a spin resonance.

SUMMARY

Using this as a starting point, the problem to be solved by the invention is that of specifying an improved apparatus for testing data carriers having spin resonance features and in particular providing a sensor element which allows effective excitation of the spin resonance of the data carriers to be tested.

The invention provides a sensor element for testing, in particular testing the authenticity of, a planar data carrier having a spin resonance feature. For example, the planar data carrier can be a banknote. The sensor element contains a magnetic core with an air gap, into which the planar data carrier can be introduced for testing purposes, a polarization device for creating a static magnetic flux in the air gap, and a resonator device for exciting the spin resonance feature of the data carrier to be tested in the air gap. The spin resonance feature is preferably an ESR feature.

Here, the resonator device comprises a stripline resonator and a feedline structure for the stripline resonator and is designed to create a radiofrequency field with circular polarization, especially in the near field, by way of the geometry of the stripline resonator and/or the geometry of the feedline structure.

In principle, the utilized stripline resonators are particularly distinguished in that their sensitive region is very easily accessible and in that they have a very high fill factor for planar samples, as represented by the banknotes to be tested. The stripline resonators are sometimes referred to below as resonators purely for brevity.

Moreover, the present invention is based on the observation that conventional stripline resonators create a linearly polarized field of amplitude $B_1$ in banknote processing machines. Such a linearly polarized field can always be decomposed into two counterrotating circularly polarized fields, with only one of the two components, however, being active during the excitation and detection of the spin resonance feature. Thus, only half of the radiofrequency power can be used for the spin excitation; the unused portion leads to increased waste heat and thus is bothersome.

In a conventional sensor, only the suitably circularly polarized component of the $B_1$ field therefore experiences an absorption in the spin resonance feature to be tested, whereas the oppositely polarized component does not. Hence a low signal-to-noise ratio is attained when a linearly polarized resonator, in particular the linearly polarized resonator used for the excitation, is used to detect the absorption in the feature since the "incorrectly" circularly polarized component, which remains unmodified by the spin resonance feature, is always measured as well.

The sensor element according to the invention having a resonator device creating a circularly polarized field, by contrast, enables a more efficient excitation and detection of spin resonance. Specifically, the sensitivity can be increased by up to a factor of $\sqrt{2}$, or the required excitation power can be reduced by a factor of 2.

In an advantageous configuration, the resonator device is a passive, circularly polarized resonator device, in particular a resonator device without active electronic phase shifters. Active electronic phase shifters require large amounts of energy and space and are therefore not advantageous for use in a test apparatus for testing planar data carriers, especially in banknote processing machines.

By preference, the feedline structure of the resonator device contains no more than two feedlines for the stripline resonator since a greater number of feedlines leads to increased signal distortion.

In an advantageous configuration, the resonator device comprises a conductive structure of characteristic length l as stripline resonator. The feedline structure in this case contains exactly two feedlines for the stripline resonator and a retardation line for creating a phase shift between signals in the two feedlines.

In another, likewise advantageous configuration, the resonator device comprises a conductive structure of characteristic length l as stripline resonator, and the feedline structure contains exactly one feedline to the stripline resonator connected to the stripline resonator at a contact point. In particular, the contact point is at the center of the boundary line between the feedline and the stripline resonator. The stripline resonator is preferably designed to be symmetrical to at least two axes of symmetry. In particular, a contact axis is defined by the connection between the contact point and the point of intersection of the axes of symmetry. Further, the stripline resonator has edges that are preferably at an angle of between 40° and 50°, in particular substantially at a 45° angle, to the contact axis.

Advantageously, the stripline resonator has a planar embodiment with a principal plane of extent which is perpendicular to the direction of static magnetic flux created by the polarization device.

Since the direction of static magnetic flux is also referred to as z-direction within the scope of this description, the principal plane of extent or principal plane of the stripline resonator accordingly extends in the xy-plane that is perpendicular to the z-direction.

The resonator device is advantageously arranged in the air gap such that a planar data carrier inserted for testing is located in the near field of the excitation field created by the stripline resonator.

Advantageously, the resonator device is designed for the excitation of spin resonance signals at a frequency above 1 GHz, in particular between 1 GHz and 10 GHz. Compared to lower frequencies, this allows a higher spectral resolution and a stronger measurement signal.

The resonator device is also designed in particular for detecting spin resonance signals of the spin resonance feature. The resonator device can in particular record a response signal of the spin resonance feature and output it to a detector. The spin resonances can be determined, for example, with a continuous wave (CW) method, a pulsed method, or a rapid scan method.

During data carrier testing, the stripline resonator can be operated both in reflection and in transmission. The advantage of the latter is that the signal branch requires no element such as a circulator which separates the signals propagating to and from the resonator.

The air gap advantageously has a height, i.e. a dimension in the z-direction, of less than 10 mm, preferably of less than 5 mm. This allows the creation of a particularly strong polarization field, i.e. a strong static magnetic flux, in the air gap.

Advantageously, the resonator device comprises a planar carrier, on which the stripline resonator and the feedline structure are applied. Advantageously, the carrier is formed by a printed circuit board, allowing reproducible and cost-effective production. However, the use of carriers on the basis of ceramic, Teflon or hydrocarbons is also advantageous, especially for reducing dielectric losses in the carrier material.

The invention also contains a test apparatus for testing a planar data carrier, in particular a banknote, having a spin resonance feature, comprising a sensor element of the above-described type and comprising exactly one signal source, from which the resonator device is fed with a predetermined excitation frequency.

In an advantageous configuration of the test apparatus, the resonator device comprises a conductive structure of characteristic length l as stripline resonator, and the feedline structure contains exactly two feedlines for the stripline resonator and a retardation line to create a phase shift between signals in the two feedlines. Here, the two feedlines are fed from the same signal source, and the retardation path of the retardation line corresponds to a phase shift of 90° at the predetermined excitation frequency.

Advantageously, the test apparatus also contains a transport device which introduces the planar data carriers to be tested along a transport path into a test position in the air gap or passes them through a test position in the air gap of the magnetic core, wherein the resonator device is arranged in the air gap such that the test position is located in the near field of the excitation field created by the stripline resonator.

The transport device is designed and configured in particular for high-speed transport, for example between 1 m/s and 12 m/s, of the planar data carriers to be tested along the transport path.

The invention also contains a method for testing a planar data carrier, in particular a banknote, having a spin resonance feature by means of a sensor element of the described type or a test apparatus of the described type, wherein in the method

- a planar data carrier to be tested is inserted into the air gap of the magnetic core of the aforementioned sensor element,
- a static magnetic flux is created using the polarization device and a time-varying magnetic modulation field is created in the air gap preferably using a modulation device, and
- the resonator device is used to excite the spin resonance feature of the data carrier to be tested.

Advantageously, a response signal of the spin resonance feature created by the excitation is also recorded with the resonator device and output to a detector. The excitation of the spin resonance feature and/or the recording of the response signal of the spin resonance feature can be carried out in a continuous wave (CW) method, in a pulsed method, or in a rapid scan method.

BRIEF DESCRIPTION OF THE DRAWINGS

Further exemplary embodiments as well as advantages of the invention are explained below by reference to the figures, in the representation of which a true-to-scale and proportional reproduction has been omitted in order to increase the clarity.

In the drawing:

FIG. 1 schematically shows a test apparatus of a banknote processing system for measuring spin resonances of a banknote test object, FIG. 2, including FIGS. 2(*a*) and 2(*b*), schematically shows, in cross section in 2(*a*) and in plan view in 2(*b*), a resonator device of the test apparatus of FIG. 1, and FIG. 3 shows, in FIGS. 3(*a*) to 3(*d*), further configurations of passive circularly polarized resonator devices, in which the feedline structure comprises only one feedline in each case.

DETAILED DESCRIPTION OF VARIOUS EMBODIMENTS

The invention is now explained using the example of testing the authenticity of banknotes. In this respect, FIG. 1 schematically shows a test apparatus 20 of a banknote processing system for measuring spin resonances of a banknote test object 10.

The banknote test object 10 contains a spin resonance feature 12 to be tested, the characteristic properties of which are used to prove the authenticity of the banknote. For the authenticity test, the banknote test object 10 is guided along a transport path 14 through a sensor element 30 according to the invention of the test apparatus 20. For the detection of spin resonance signatures of the spin resonance feature 12, the sensor element 30 creates three different magnetic fields in the measurement region.

Firstly, a polarization device 34 creates a static magnetic flux parallel to the z-axis in the measurement region. In order to create a strong polarization field, the height of the air gap in the z direction is advantageously less than 10 mm, in particular even less than 5 mm.

Secondly, a modulation device 36 generates a time-varying magnetic modulation field in the air gap, which also runs parallel to the z-axis and has a modulation frequency $f_{Mod}$ in the range between 1 kHz to 1 MHz. Finally, a resonator device 40 creates an excitation field in the air gap, which induces the energy transitions between the spin energy levels in the spin resonance feature 12. The excitation field typically has frequencies above 1 GHz and is polarized perpendicular to the z-direction.

The frequency of the excitation field is tuned to the Larmor frequency of the spin resonance feature 12 to be detected, in order to measure its spin resonance signature and to allow it to be used for the authenticity test. To this end, the test apparatus 20 contains a signal source 22, the excitation frequency few of which corresponds to the expected Larmor frequency of the spin resonance feature 12. The excitation signal from the signal source 22 is supplied via a duplexer 24 to a resonator device 40 and creates an alternating magnetic field of the frequency $f_{MW}$ there.

In addition to the aforementioned elements, the test apparatus 20 contains a detector diode 26 for measuring the radiofrequency power reflected by the resonator device 40 and an evaluation unit 28 for evaluating and optionally displaying the measurement result. If the spin resonance feature 12 resonates at an incoupled frequency $f_{MW}$, then there is a change in the resonator quality and hence a change in the power reflected by the stripline resonator. On account of the modulation of the static polarization field brought about by the modulation device 36, the precise value of the Larmor frequency of the sample oscillates, and so the measurement signal obtained is amplitude-modulated with the modulation frequency.

In the present invention, the resonator device 40 contains a stripline resonator 46 and a feedline structure 44 for the stripline resonator 46, wherein the resonator device 40 is designed to create a radiofrequency field with circular polarization by way of the geometry of the stripline resonator 46 and/or the geometry of the feedline structure 44.

For a detailed explanation, FIG. 2 schematically shows such a resonator device 40, in cross section in (a) and in plan view in (b). The resonator device 40 comprises a planar carrier, for example in the form of a printed circuit board 42, with a top side facing the test object 10 during the measurement and a bottom side facing away from the test object.

A conductive structure of characteristic length l is arranged on the top side of the printed circuit board 42 as stripline resonator 46, and a ground plane 48 is arranged on the bottom side. The feedline structure and the coupling of the conductive structure 46 are not depicted in the schematic cross section of FIG. 2(*a*) for the sake of clarity.

As explained above, conventional stripline resonators create a linearly polarized magnetic field, only a portion of which, specifically one of the two oppositely circularly polarized components, can be used for the spin excitation of a spin resonance feature. The unused component leads to increased waste heat on the one hand and to a lower signal-to-noise ratio during the detection on the other hand since the non-active circularly polarized component is always measured as well-if the same resonator is used for excitation and detection. Here, a significantly improved detection can be attained by use of a resonator device according to the invention for creating a circularly polarized magnetic field.

Referring to the plan view in FIG. 2(*b*), the resonator device 40 in the exemplary embodiment comprises a stripline resonator 46 as conductive structure of characteristic length l and a feedline structure 44 with two feedlines and a passive phase shift. The two signal branches are phase-shifted by 90° by way of a retardation line of length $\Delta=\lambda/4$, and so a circularly polarized excitation field $B_1$ is created in the stripline resonator 46. Here, $\lambda$ is the wavelength of the excitation signal created by the signal source 22.

FIG. 3 shows further advantageous configurations of passive circularly polarized resonator devices, in which the feedline structure comprises only a single feedline in each case and in which the circular polarization of the created excitation field arises by virtue of the stripline resonator comprising edges at an angle to the feedline. In particular, the feedline is connected to the stripline resonator at a contact point 100, wherein the stripline resonator is designed to be symmetrical to at least two axes of symmetry 56, wherein a contact axis 101 is defined by the connection between the contact point 100 and the point of intersection of the axes of symmetry 56, and wherein the stripline resonator has edges that are substantially at a 45° angle to the contact axis 101, for example at an angle of between 40° and 50°. For illustrative purposes, each stripline resonator in these exemplary embodiments is formed on the basis of a square microstrip resonator 50 of side length l.

FIG. 3 (*a*) initially shows a resonator device 70, in which a stripline resonator 46 with a single feedline 52 is arranged on a printed circuit board 42. The stripline resonator 46 is formed by a square microstrip resonator 50 with a diagonal, central cutout 54 that is at a 45° angle to the feedline 52. The axes of symmetry 56 intersect at the center of the cutout 54. Thus, the contact axis 101 corresponds to the axis of the feed line 52 in this example and is at a 45° angle to the edges of the cutout 54.

In the resonator device 72 as per the exemplary embodiment in FIG. 3(*b*), the stripline resonator 46 is formed by a microstrip resonator 50, in which two diagonally opposite corners 58 of a complete square have been cut off. The axes of symmetry 56 of the stripline resonator 46 intersect at the center of the structure. Thus, the contact axis 101 corresponds to the axis of the feed line 52 in this example and is at a 45° angle to the chamfered edges 58.

In the resonator device 74 according to the exemplary embodiment in FIG. 3(*c*), the square stripline resonator 50 contains a via 60 on the square diagonal for coupling the signal through the back side of the printed circuit board 42. This via does not form a symmetry-breaking element but defines the contact point 100. The stripline resonator 50 has four axes of symmetry 56 that intersect at the center of the square. The contact axis 101 corresponds to a diagonal of the square and is therefore at a 45° angle to the latter's edges.

In the resonator device 76 of the exemplary embodiment in FIG. 3(*d*), the only feed line 52 is coupled to a corner 62 of a square stripline resonator 50. The stripline resonator 50 has four axes of symmetry 56 that intersect at the center of the square. The contact axis 101 corresponds to a diagonal of the square and is therefore at a 45° angle to the latter's edges.

The configurations of FIG. 3 with only a single feedline have the advantage over a design with two feedlines as per FIG. 2 that fewer signal conductors are situated on the top side of the structure, and hence possible distortions in the phase behavior of the signal supply are suppressed.

To demonstrate the advantages of sensor elements according to the invention with a circularly polarized resonator device, the behavior of a sensor element having a square 22 stripline resonator as per FIG. 2 was simulated.

The stripline resonator is mounted on a printed circuit board with a thickness of 1.5 mm, the dielectric constant of which is 3.66. The edge length of the resonator is 7.1 mm, corresponding to a resonant frequency of 9.8 GHz. The resonator is connected by way of the feedline structure shown in FIG. 2. To this end, the resonator impedance at two perpendicular edges was transformed to 100Ω with the aid of λ/4 impedance transformers. The signal in one of the two lines was retarded by a phase of 90° with the aid of an additional conductor track. An input impedance of 50Ω arises due to the subsequent parallel connection of the two feedlines. The stripline resonator obtained thus creates an excitation field with circular polarization by way of the connection from two sides and the 90° retardation line.

For a comparison example, the behavior of a comparison stripline resonator was simulated, the latter having the same geometry as the resonator according to the invention but being connected, without retardation path, to the signal line at only one edge and thus creating a linearly polarized excitation field in conventional fashion.

The resonator device according to the invention as per FIG. 2 has a quality Q approximately 15% lower than that of the comparison resonator. Current understanding suggests this lower quality can be traced back to losses and imperfections in the coupling network.

To be able to quantify the detection properties of the resonator device according to the invention and comparison resonator, a spin resonance measurement was subsequently simulated with both resonator devices. To this end, each resonator device was introduced into the air gap of a permanent magnetic circuit. Moreover, a paper sample carrying a spin resonance feature and a planar modulation coil for creating the modulation field were also located in this air gap. In this case, the spin resonance feature was designed such that the spin transitions are excited with a right-hand circularly polarized excitation field $B_1$in relation to the $B_0$flux direction.

The resonator device of FIG. 2 was introduced into the air gap with two different orientations during the simulation, specifically once in a manner to create a left-hand polarized field in relation to the $B_0$flux direction and once in a manner to create a right-hand polarized field. On account of the aforementioned design of the spin resonance feature, a noteworthy excitation of spin transitions is only expected in the latter orientation.

The spin resonance signal of the paper sample was recorded with each of the three sensor elements constructed thus. This resulted in the signal obtained by the sensor element equipped with the resonator device according to the invention configured for right-hand polarization being higher than that obtained by the sensor element having the linearly polarized comparison resonator by a factor of 1.27. Current understanding suggests that this falling short of the maximum possible intensity increase by a factor $\sqrt{2} \approx 1.41$ can be traced back to the slightly lower quality Q of the circularly polarized resonator.

As expected, a virtually vanishing signal amplitude was measured by the resonator configured for left-hand polarization, which was not matched to the spin resonance of the paper sample.

| List of reference signs | |
|---|---|
| 10 | Banknote test object |
| 12 | Spin resonance feature |
| 14 | Transport path |
| 20 | Test apparatus |
| 22 | Signal source |
| 24 | Duplexer |
| 26 | Detector diode |
| 28 | Evaluation unit |
| 30 | Sensor element |
| 34 | Polarization device |
| 36 | Modulation device |
| 40 | Resonator device |
| 42 | Printed circuit board |
| 44 | Feedline structure |
| 46 | Stripline resonator |
| 48 | Ground plane |
| 50 | Square microstrip resonator |
| 52 | Feedline |
| 54 | Diagonal central cutout |
| 56 | Axes of symmetry |
| 58 | Diagonally opposite corners |
| 60 | Via |
| 62 | Corner |
| 70, 72, 74, 76 | Resonator devices |

The invention claimed is:

1. A sensor element for testing a planar data carrier having a spin resonance feature, comprising:

a magnetic core with an air gap, into which the planar data carrier can be inserted for testing purposes, a polarization device for creating a static magnetic flux in the air gap, and a resonator device for exciting the spin resonance feature of the data carrier to be tested in the air gap, wherein the resonator device comprises a stripline resonator and a feedline structure for the stripline resonator and is designed to create a radiofrequency field with circular polarization by way of the geometry of the stripline resonator and/or the geometry of the feedline structure.

2. The sensor element according to claim 1, wherein the resonator device is a passive, circularly polarized resonator device without active electronic phase shifters.

3. The sensor element according to claim 1, wherein the feedline structure of the resonator device contains no more than two feedlines for the stripline resonator.

4. The sensor element according to claim 1, wherein the resonator device comprises a conductive structure of characteristic length 1 as stripline resonator, and in that the feedline structure contains exactly two feedlines for the stripline resonator and a retardation line for creating a phase shift between signals in the two feedlines.

5. The sensor element according to claim 1, wherein the resonator device comprises a conductive structure of characteristic length 1 as stripline resonator, and in that the feedline structure contains exactly one feedline to the stripline resonator connected to the stripline resonator at a contact point, wherein the stripline resonator is designed to be symmetrical to at least two axes of symmetry, wherein a contact axis is defined by the connection between the contact point and the point of intersection of the axes of symmetry, and wherein the stripline resonator has edges that are formed at an angle of between 40° and 50° to the contact axis.

6. The sensor element according to claim 1, wherein the stripline resonator has a planar embodiment with a principal plane of extent which is perpendicular to the direction of static magnetic flux created by the polarization device.

7. The sensor element according to claim 1, wherein the resonator device is arranged in the air gap in such a way that a planar data carrier inserted for testing is located in the near field of the excitation field created by the stripline resonator.

8. The sensor element according to claim 1, wherein the resonator device is designed for the excitation of spin resonance signals at a frequency above 1 GHz.

9. The sensor element according to claim 1, wherein the air gap has a height of less than 10 mm.

10. A test apparatus for testing a planar data carrier having a spin resonance feature, comprising:

a sensor element according to claim 1 and exactly one signal source, from which the resonator device is fed with a predetermined excitation frequency.

11. The test apparatus according to claim 10, wherein the resonator device comprises a conductive structure of characteristic length 1 as stripline resonator, and in that the feedline structure contains exactly two feedlines to the stripline resonator and a retardation line for creating a phase shift between signals in the two feedlines, and in that the two feedlines are fed from the same signal source, and the retardation path of the retardation line corresponds to a phase shift of 90° at the predetermined excitation frequency.

12. The test apparatus according to claim 10, having a transport device which introduces the planar data carriers to be tested along a transport path into a test position in the air gap or passes them through a test position in the air gap of the magnetic core, wherein the resonator device is arranged in the air gap such that the test position is located in the near field of the excitation field created by the stripline resonator.

13. The test apparatus according to claim 12, wherein the transport device is designed and configured for high-speed transport of the planar data carriers to be tested along the transport path.

14. A method for testing a planar data carrier having a spin resonance feature, by means of a sensor element or a test apparatus according to claim 10, wherein in the method a planar data carrier to be tested is inserted into the air gap of the magnetic core of the aforementioned sensor element, a static magnetic flux is created using the polarization device and a time-varying magnetic modulation field is created in the air gap using a modulation device, and the resonator device is used to excite the spin resonance feature of the data carrier to be tested.

* * * * *